(12) United States Patent
Lin

(10) Patent No.: US 8,864,143 B2
(45) Date of Patent: Oct. 21, 2014

(54) SMALL OUTER DIAMETER QUICK RELEASE EXTENSION ROD

(76) Inventor: Ying-Mo Lin, Nantou (TW)

( * ) Notice: Subject to any disclaimer, the term of this patent is extended or adjusted under 35 U.S.C. 154(b) by 789 days.

(21) Appl. No.: 13/168,921

(22) Filed: Jun. 24, 2011

(65) Prior Publication Data

US 2012/0126497 A1    May 24, 2012

(30) Foreign Application Priority Data

Nov. 23, 2010 (TW) .............................. 99222664 U

(51) Int. Cl.
| | | |
|---|---|---|
| B23B 31/107 | (2006.01) | |
| B23B 31/28 | (2006.01) | |
| B25B 23/00 | (2006.01) | |
| B25B 23/12 | (2006.01) | |

(52) U.S. Cl.
CPC ............ B25B 23/0035 (2013.01); B23B 31/107 (2013.01); B23B 31/28 (2013.01); B25B 23/12 (2013.01); *Y10S 279/906* (2013.01)
USPC .............. 279/23.1; 279/24; 279/79; 279/128; 279/137; 279/906; 81/177.85; 81/438

(58) Field of Classification Search
CPC .............. B23B 31/107; B23B 31/1078; B23B 31/1173; B23B 2231/32; B23B 23/0035
USPC ........ 279/23.1, 24, 79, 906, 29, 76, 128, 137; 81/177.85, 438

IPC ....................................................... B23B 31/107
See application file for complete search history.

(56) References Cited

U.S. PATENT DOCUMENTS

| | | | | |
|---|---|---|---|---|
| 2,396,771 | A | * | 3/1946 | Brinson, Sr. .................. 401/244 |
| 2,396,866 | A | * | 3/1946 | Lytton .......................... 401/244 |
| 2,476,762 | A | * | 7/1949 | Petre et al. ...................... 279/96 |
| 2,775,306 | A | * | 12/1956 | Middleton et al. ........... 279/23.1 |
| 4,787,278 | A | * | 11/1988 | Bononi ........................... 81/438 |
| 6,145,851 | A | * | 11/2000 | Heber ........................... 279/143 |
| 6,695,321 | B2 | * | 2/2004 | Bedi et al. ....................... 279/22 |
| 6,840,143 | B1 | * | 1/2005 | Lin ................................. 81/438 |
| 6,973,858 | B2 | * | 12/2005 | Huang ....................... 81/177.85 |
| 7,114,728 | B2 | * | 10/2006 | Chen ............................... 279/24 |
| 8,262,097 | B2 | * | 9/2012 | Lai ................................. 279/74 |

FOREIGN PATENT DOCUMENTS

DE    202004000244 U1 *  4/2004    .............. B25B 23/00

* cited by examiner

*Primary Examiner* — Eric A Gates
(74) *Attorney, Agent, or Firm* — Banger Shia

(57) ABSTRACT

A small outer diameter quick release extension rod is provided with elongated sheet-shaped elastic elements therein for realizing the effect of engaging with a screwdriver head. A second positioning ring in the operating element is used to press against the elastic elements to control them to be engaged in or disengaged from the screwdriver head. The small outer diameter quick release extension rod is easy to operate and has a relatively small outer diameter, not only reducing the structure weight and energy loss, but also enhancing the flexibility of use.

10 Claims, 9 Drawing Sheets

SMALL OUTER DIAMETER QUICK RELEASE EXTENSION ROD

BACKGROUND OF THE INVENTION

1. Field of the Invention

The present invention relates to means for fastening, disassembling, clamping or connecting a hand tool, and more particularly to a small outer diameter quick release extension rod.

2. Description of the Prior Art

Extension rod is one of very common tools in hand tool industry. To facilitate replacing a tool head B, a conventional extension rod A is normally used together with a positioning-controlling structure 10. As shown in FIG. 1, the extension rod A is inserted in one end of an inner rod 11, and the other end of the inner rod 11 is connected to the too head B. A slide sleeve 12 is mounted on the inner rod 11 and includes a notch 121 in an inner surface thereof facing the inner rod 11. In the notch 121 is movably disposed a positioning steel ball 13. Under normal condition, the notch 121 of the slide sleeve 12 is misaligned with the positioning steel ball 13 in such a manner that the slide sleeve 12 is pressed against the positioning steel ball 13, and the positioning steel ball 13 presses against the tool head B to keep the tool head B in a fixed position. When the slide sleeve 12 elastically moves relative to the inner rod 11 to align the notch 121 of the slide sleeve 12 with the positioning steel ball 13, the positioning steel ball 13 will slide into the notch 121 of the slide sleeve 12, releasing the tool head B.

However, as known from the above structural relationship, to achieve the effect of positioning and controlling, the conventional extension rod should employ the inner rod 11 and the slide sleeve 12 together. For the same reason, the outer diameter of the positioning-controlling structure is increased, which leads to a certain degree of difference between the outer diameters of the extension rod A, the tool head B and the positioning-controlling structure 10, causing much inconvenience in use. In addition, since the positioning-controlling structure 10 must include the inner rod 11 and the slide sleeve 12, the weight of the positioning-controlling structure 10 is also increased. When a drive tool is used to drive the extension rod A, much more energy will be wasted.

The present invention has arisen to mitigate and/or obviate the afore-described disadvantages.

SUMMARY OF THE INVENTION

The primary objective of the present invention is to provide a small outer diameter quick release extension rod which has a relatively small outer diameter and enhances the flexibility of use.

To achieve the above objective, a small outer diameter quick release extension rod in accordance with the present invention comprises:

a sleeve includes a through hole, and the through hole including a screwdriver head accommodation portion and at least one lateral accommodation portion which is disposed at a circumference of the screwdriver head accommodation portion in a communication manner, the screwdriver head accommodation portion being provided for insertion of a screwdriver head;

an operating unit, including:

an operating element being a hollow structure and including a first end and a second end that are both open;

a connecting rod including a connecting end and an inserting end, the connecting rod being inserted into the operating element, the connecting end extending out of the second end of the operating element for connection to a power tool;

a first positioning ring being mounted on the connecting rod;

a retuning spring being engaged the first positioning ring and the inserting end of the connecting rod, one end of the returning spring abutting against the first positioning ring;

at least one elastic element being elongated sheet-shaped and including a body portion connected between a pushed portion and an engaging portion, an extending direction of the pushed portion being reverse to that of the body portion, and between an extending direction of the engaging portion and the extending direction of the body portion being defined an angle of 45±15 degrees, the at least one elastic element being disposed at an inner side of the operating element, the body portion of the elastic element being abutted against the connecting rod, the pushed portion of the elastic element being abutted against the returning spring, and the engaging portion of the elastic element extending out of the first end of the operating element; and the second positioning ring being connected to an inner surface of the operating element, the second positioning ring encircling the body portion of the respective elastic element and being abutted against the pushed portion of the elastic element, the operating unit being engaged on the second end of the sleeve through the first end of the operating element, and the engaging portion of the elastic element which extends out of the operating element being inserted into the lateral accommodation portion of the sleeve.

The quick release extension rod utilizes the elastic element to realize the effect of positioning screwdriver head, so that the outer diameter of the quick release extension rod can be greatly reduced, not only enhancing the flexibility of use, but reducing the energy loss of the power tool. The user can control the positioning easily by making the operating element slide, so that it is very convenient to use and operate the small outer diameter quick release extension rod of the present invention.

DETAILED DESCRIPTION OF THE PREFERRED EMBODIMENTS

Figure 1:
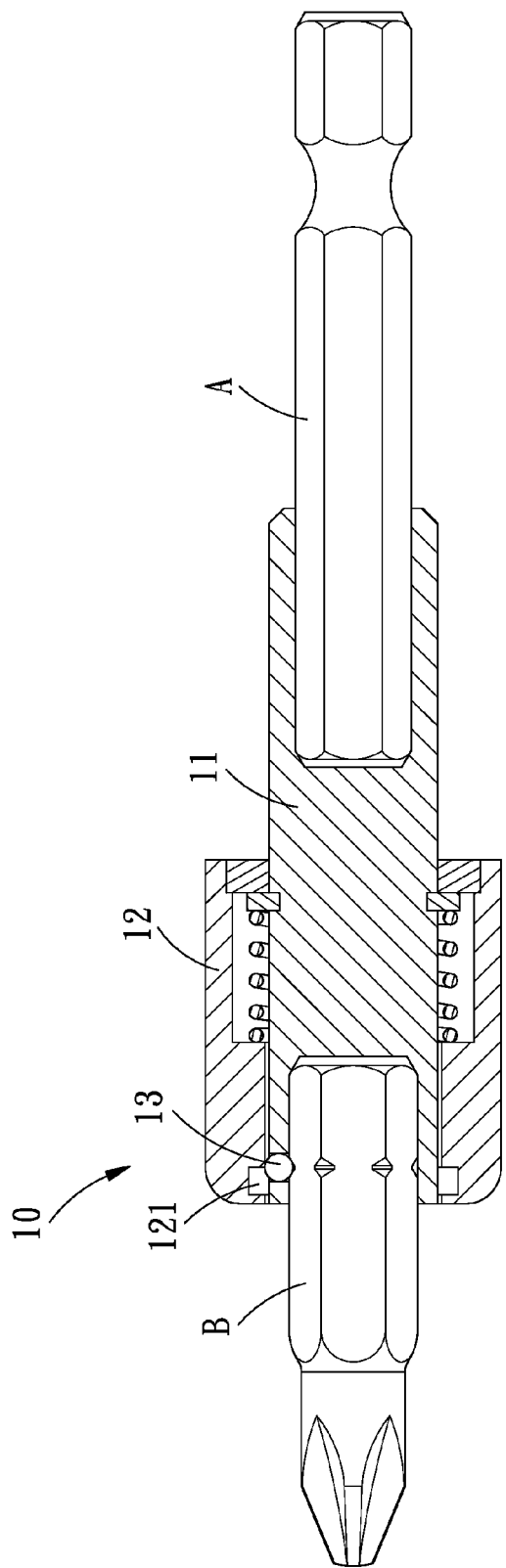
FIG. 1 is a cross-sectional view of a conventional positioning-controlling structure.
Figure 2:
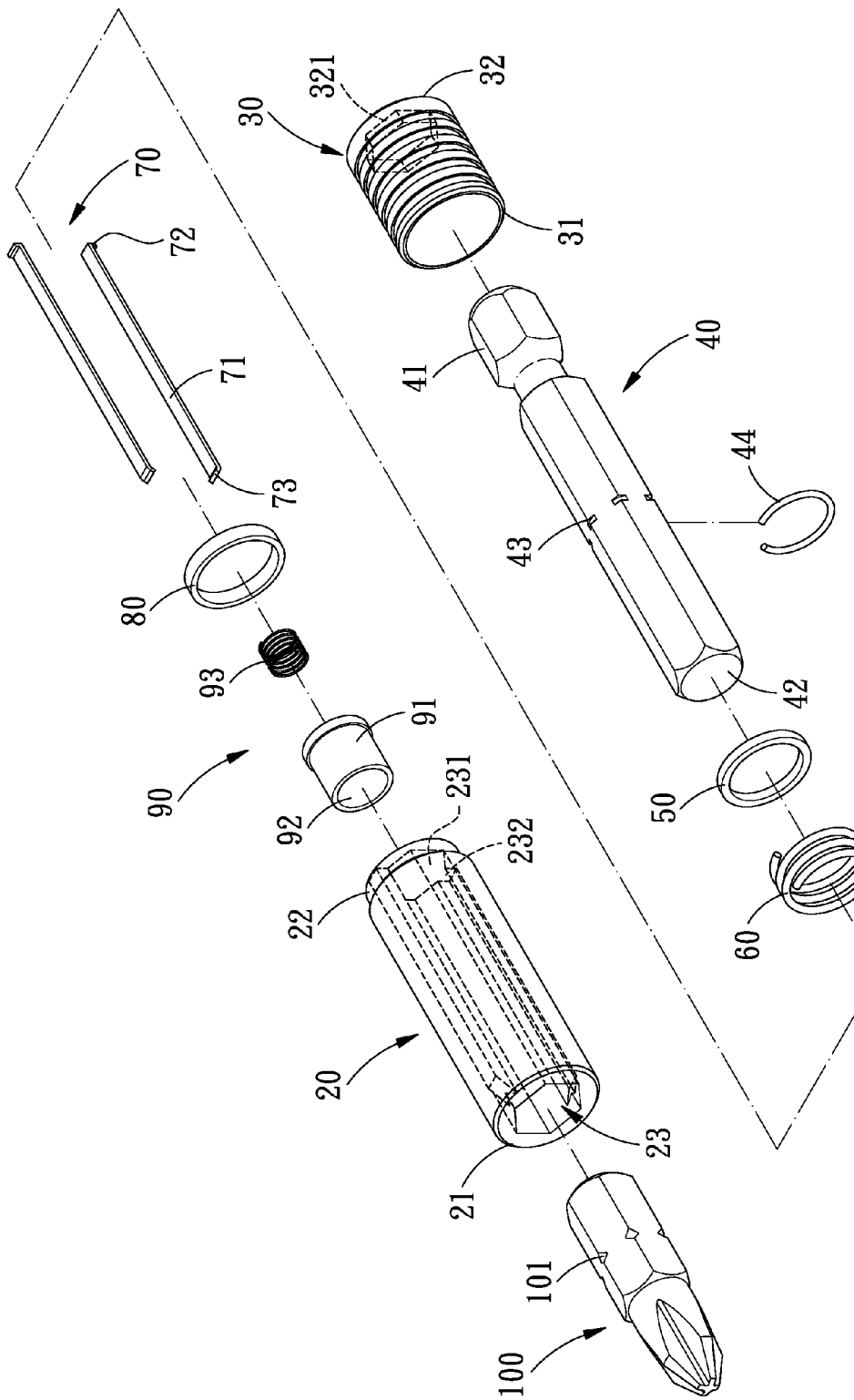
FIG. 2 is an exploded view of a small outer diameter quick release extension rod in accordance with the present invention.
Figure 3:
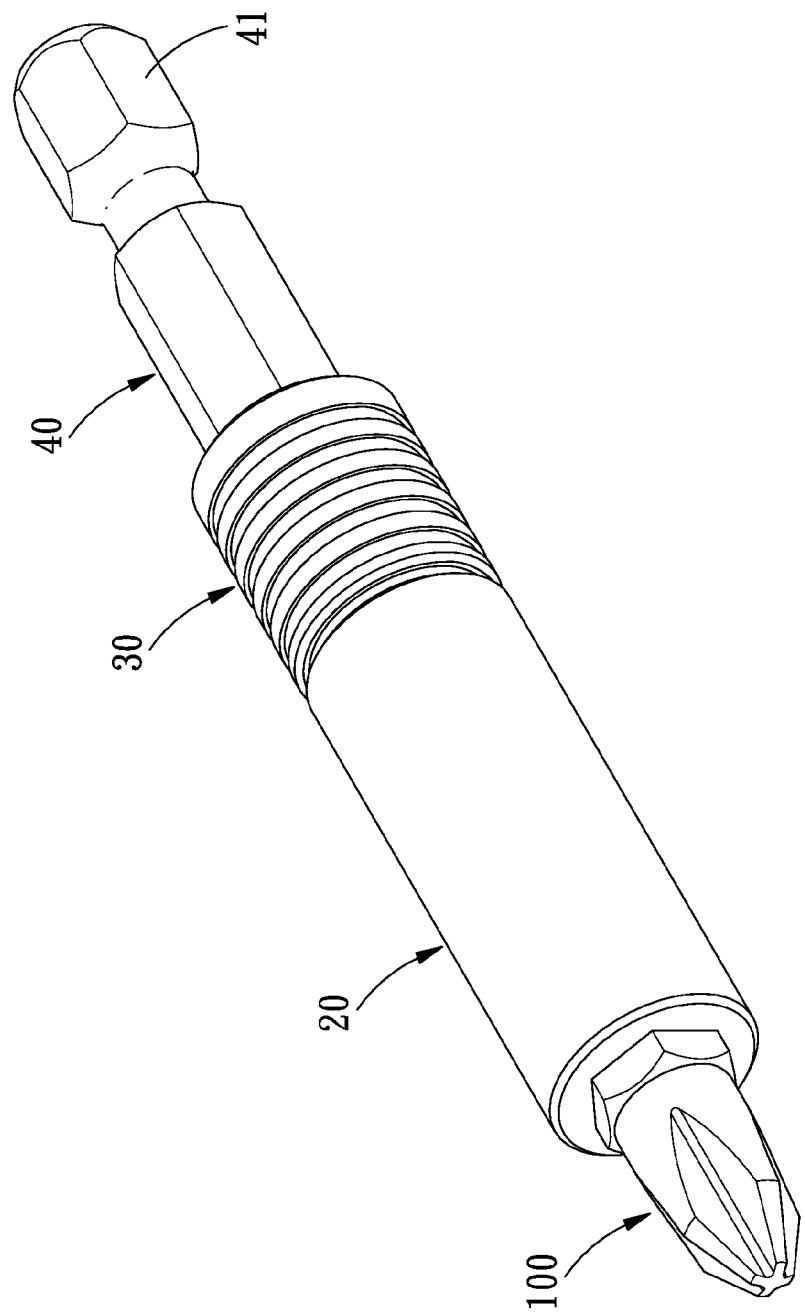
FIG. 3 is a perspective view of the small outer diameter quick release extension rod in accordance with the present invention.

The present invention will be clearer from the following description when viewed together with the accompanying drawings, which show, for purpose of illustrations only, the preferred embodiment in accordance with the present invention.

Referring to FIGS. 2-6, a small outer diameter quick release extension rod in accordance with a preferred embodiment of the present invention comprises a sleeve 20, an operating unit, and a magnetic unit 90.

The sleeve 20 is hollow and includes a first end 21, and a second end 22. The second end 22 is smaller than the first end 21 in outer diameter. The sleeve 20 includes a through hole 23, and the through hole 23 of the sleeve 20 includes a screwdriver head accommodation portion 231 and at least one lateral accommodation portion 232 disposed at a circumference of the screwdriver head accommodation portion 231 in a communication manner. In the present embodiment, two opposite lateral accommodation portions 232 are disposed at the circumference of the screwdriver head accommodation portion 231. The screwdriver head accommodation portion 231 is a hexagonal hole penetrating the first end 21 and the second end 22. The respective lateral accommodation portions 232 are formed from the second end 22 to a position adjacent to the first end 21.

The operating unit includes an operating element 30, a connecting rod 40, a C-shaped buckle 44, a first positioning ring 50, a returning spring 60, two elastic elements 70 and a second positioning ring 80.

The operating element 30 is a hollow structure and includes a first end 31 and a second end 32 that are both open. An inner diameter of the first end 31 of the operating element 30 is shaped correspondingly to the outer diameter of the second end 22 of the sleeve 20. The second end 32 of the operating element 30 includes an opening 321.

The connecting rod 40 includes a connecting end 41 and an inserting end 42 which are both in the form of a hexagonal cylinder. The connecting rod 40 is formed with plural spaced engaging concaves 43 around a peripheral surface thereof, and the C-shaped buckle 44 is fastened in the engaging concaves 43 of the connecting rod 40. The connecting rod 40 together with the C-shaped buckle 44 is inserted into the operating element 30 in such a manner that the connecting end 41 of the connecting rod 40 extends out of the opening 321 of the second end 32 of the operating element 30 for connecting to the power tool, and the inserting end 42 of the connecting rod 40 extends out of the first end 31 of the operating element 30.

The first positioning ring 50 is engaged between the C-shaped buckle 44 and the inserting end 42 of the connecting rod 40 and abutted against the C-shaped buckle 44.

The returning spring 60 is engaged between the first positioning ring 50 and the inserting end 42 of the connecting rod 40 and has one end abutted against the first positioning ring 50.

The respective elastic elements 70 are elongated sheet-shaped and includes a body portion 71 connected between a pushed portion 72 and an engaging portion 73. An extending direction of the pushed portion 72 is vertical to that of the body portion 71, and between an extending direction of the engaging portion 73 and the extending direction of the body portion 71 is defined an angle of 45±15 degrees. In the present embodiment, an angle between the engaging portion 73 and the body portion 71 is 45 degrees. The two elastic elements 70 are disposed at two opposite inner sides of the operating element 30. The body portions 71 of the respective elastic elements 70 are abutted against the connecting rod 40, the pushed portions 72 of the respective elastic elements 70 are abutted against the returning spring 60, and the engaging portions 73 of the respective elastic elements 70 extend out of the first end 31 of the operating element 30.

The second positioning ring 80 is disposed in the operating element 30 from the first end 31 of the operating element 30 and connected to an inner surface of the operating element 30. The second positioning ring 80 in the present embodiment is riveted in the operating element 30 in such a manner that the second positioning ring 80 encircles the body portions 71 of the respective elastic elements 70 and is abutted against the pushed portions 72 of the respective elastic elements 70.

The operating unit is engaged on the second end 22 of the sleeve 20 through the first end 31 of the operating element 30, and the engaging portions 73 which extend out of the operating element 30 are inserted into the two lateral accommodation portions 232 of the sleeve 20.

The magnetic unit 90 is disposed between the first end 21 and the second end 22 of the sleeve 20 and includes a magnetic base 91, a magnetic element 92 and an elastic element 93. The magnetic element 92 is disposed on one end of the magnetic base 91, and the other end of the magnetic base 91 is abutted against one end of the elastic element 93. The other end of the elastic element 93 is further abutted against the inserting end 42 of the connecting rod 40, and the magnetic element 92 of the magnetic unit 90 face toward the first end 21 of the sleeve 20.

The aforementioned is the summary of the positional and structural relationship of the respective components of the preferred embodiment in accordance with the present invention.

Figure 4:
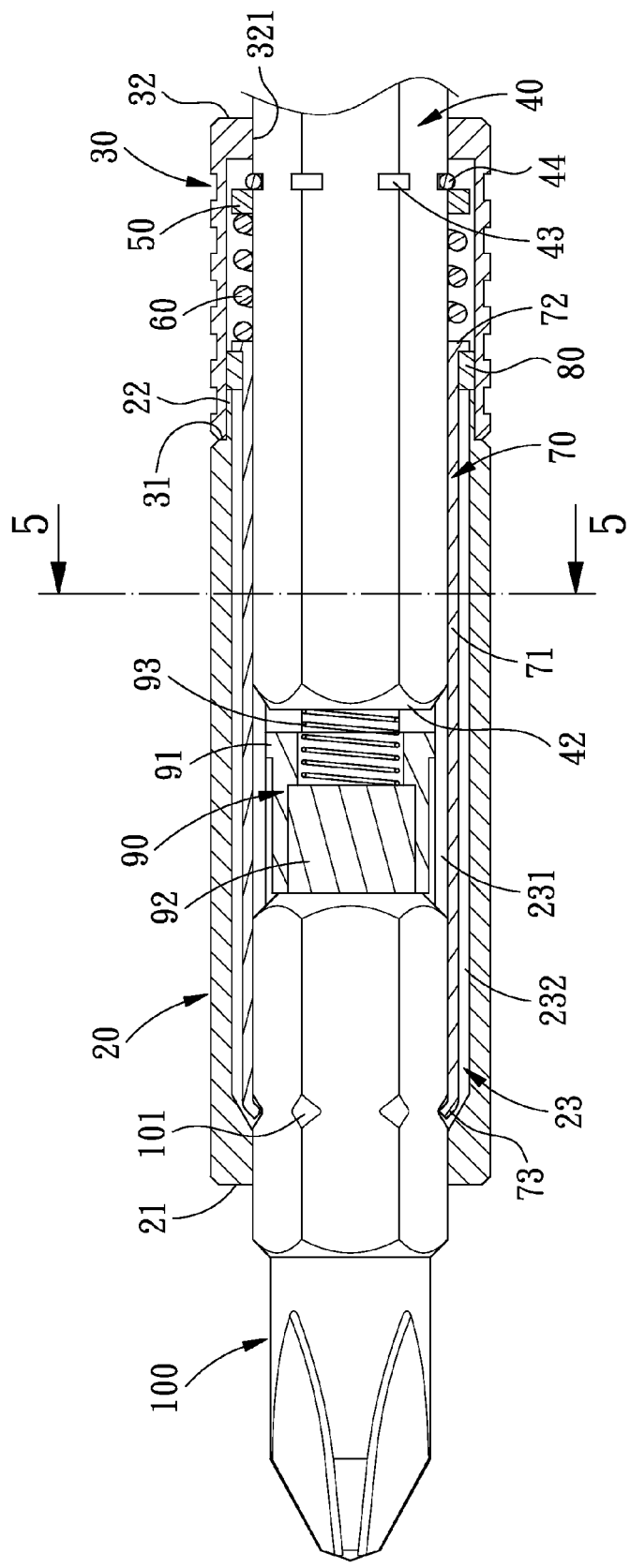
FIG. 4 is a cross-sectional view of the small outer diameter quick release extension rod in accordance with the present invention, showing a non-operated normal structural relationship.
Figure 5:
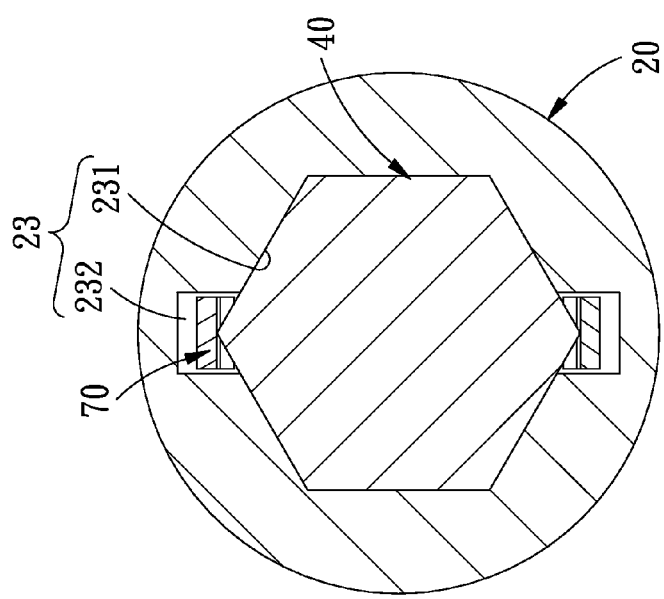
FIG. 5 is a cross-sectional view of a sleeve of the small outer diameter quick release extension rod.

The sleeve 20 of the quick release extension rod of the present invention is provided for connection to a screwdriver head 100. The screwdriver head 100 is inserted into the screwdriver head accommodation portion 231 from the first end 21 of the sleeve 20. The screwdriver head 100 includes plural engaging concaves 101 in an outer periphery thereof. Under the normal condition of not operating the quick release extension rod, as shown in FIG. 4, the screwdriver head 100 is inserted in the first end 21 of the sleeve 20 and presses against the magnetic element 92 of the magnetic unit 90, and then the magnetic element 92 will be pressed to compress the elastic element 93 together with the magnetic base 91. The magnetic element 92 magnetically attracts the screwdriver head 100, and the engaging portions 73 of the elastic elements 70 extending in the sleeve 20 will be correspondingly engaged in the engaging concaves 101 of the screwdriver head 100 to position the screwdriver head 10 onto the quick release extension rod. Meanwhile, the returning spring 60 of the operating unit normally presses against the respective elastic elements 70 and the second positioning ring 80, and the operating element 30 which is connected to the second positioning ring 80 is normally abutted against the sleeve 20 via the first end 31.

Figure 6:
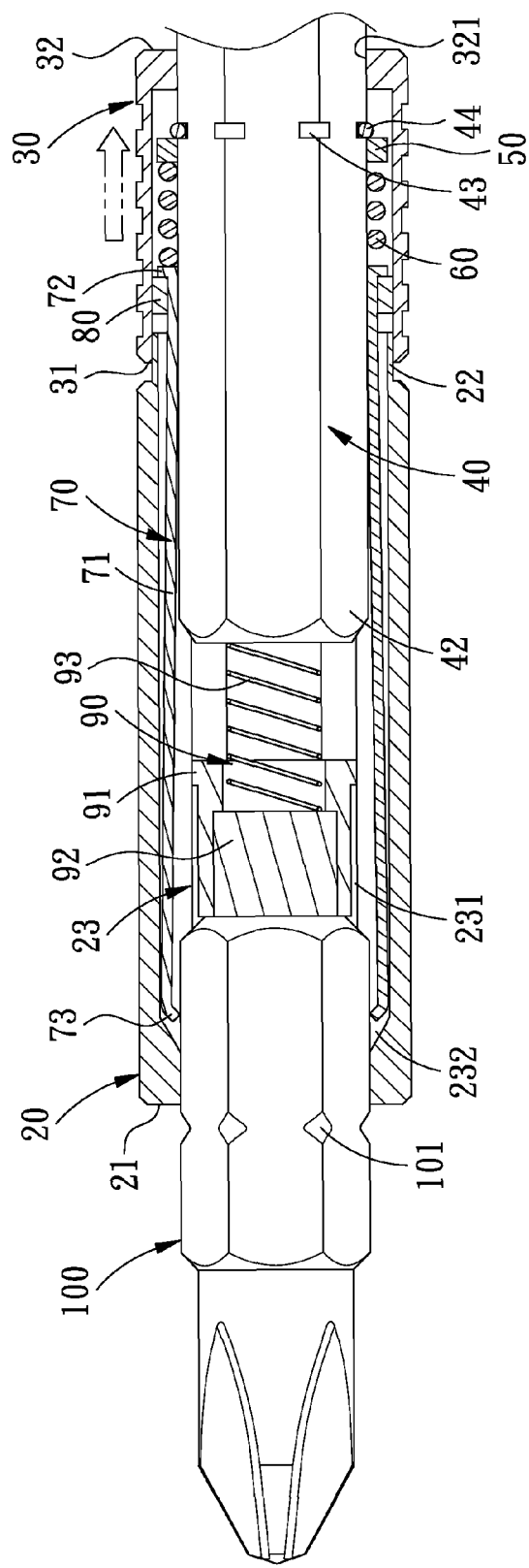
FIG. 6 is a cross-sectional view showing that the operating element is pulled away from the sleeve, and the elastic elements are disengaged from the screwdriver head.

To replace the screwdriver head 100, the user can move the operating element 30 away from the sleeve 20 by pulling, and then the operating element 30 will move the second positioning ring 80 connected to thereof, and finally the second positioning ring 80 will press against the pushed portions 72 of the respective elastic elements 70 to move them away from the sleeve 20 and compress the returning spring 60. When the respective elastic elements 70 move away from the sleeve 20, the engaging portions 73 of the respective elastic elements 70 will gradually disengage from the engaging concaves 101 of the screwdriver head 100. When the engaging portions 73 of the respective elastic elements 70 are completely disengaged from the engaging concaves 101 of the screwdriver head 100, as shown in FIG. 6, the user can take out the screwdriver head 100 for replacement, increasing convenience in use.

To summarize, the small outer diameter quick release extension rod of the present invention can realize an effect of quick operation, in addition, since the components of the present invention which are used to engage with the screwdriver head 100 are elongated sheet-shaped elastic elements 70, the quick release extension rod can be greatly reduced in outer diameter, in the present embodiment, the outer diameter can be reduced by 30% approximately, and this can enhance the flexibility of use reducing the weight of the quick release extension rod. Due to the reduction of weight of the quick release extension rod, the energy loss can be correspondingly reduced when the power tool is in use. Further, since part of their body portions 71 of the respective elastic elements 70 are abutted against the screwdriver head 100, so that the contact area between the respective elastic elements 70 and the screwdriver head 100 is increased, which can make the screwdriver head 100 be positioned more stably. As a result of this, the screwdriver head 100 is more stable and safer in use.

Figure 7:
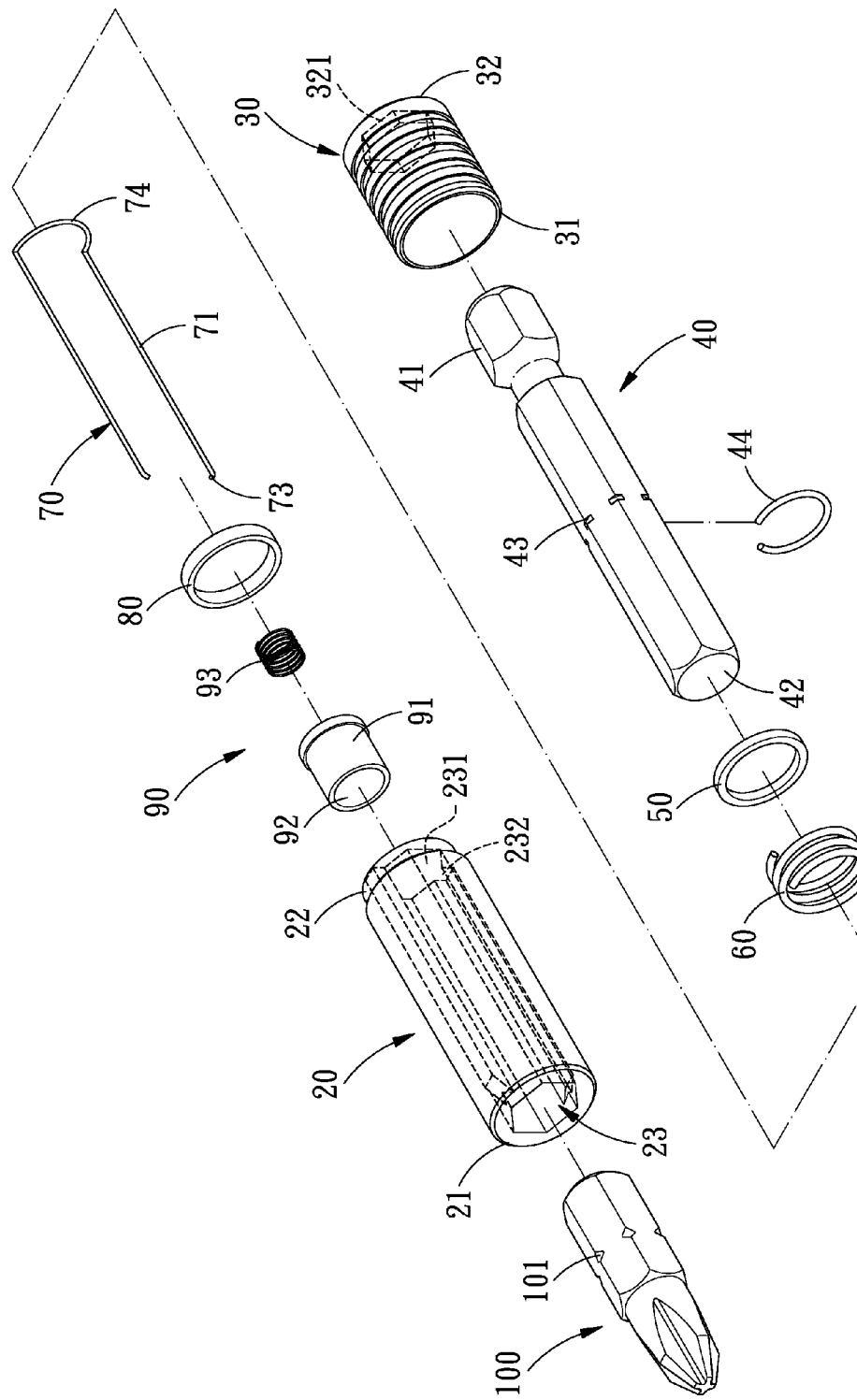
FIG. 7 is an exploded view showing the small outer diameter quick release extension rod is provided with an engaging portion between the two elastic elements.
Figure 8:
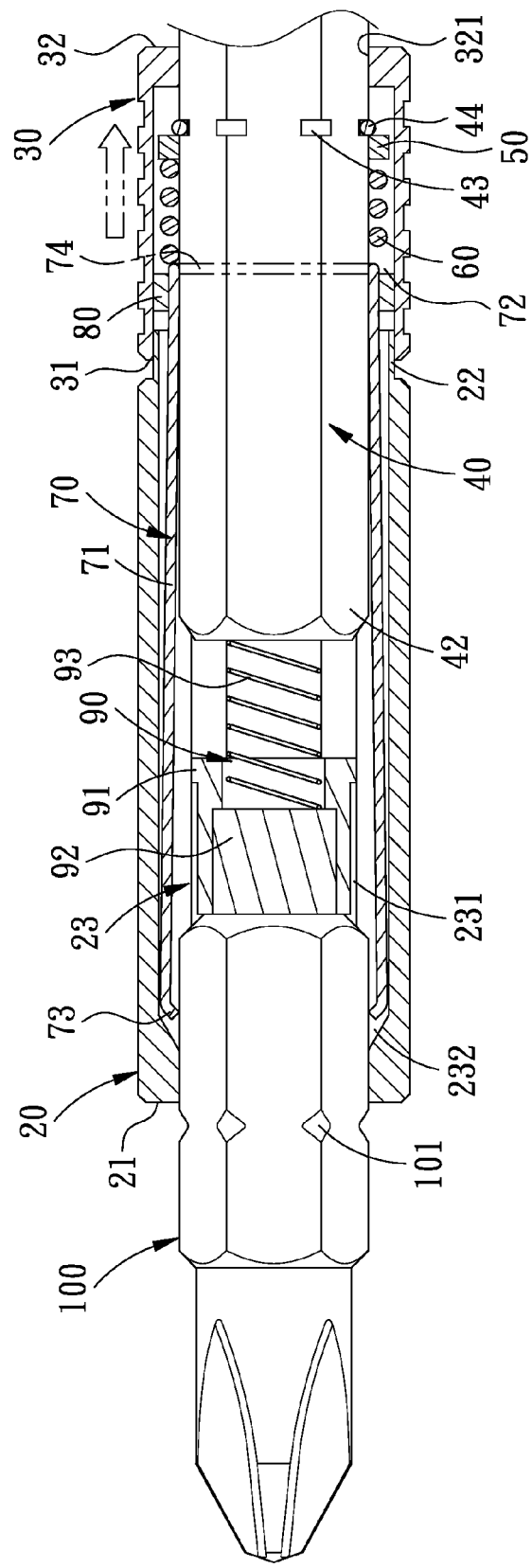
FIG. 8 is a cross-sectional view showing that the small outer diameter quick release extension rod is provided with the engaging portion between the two elastic elements.
Figure 9:
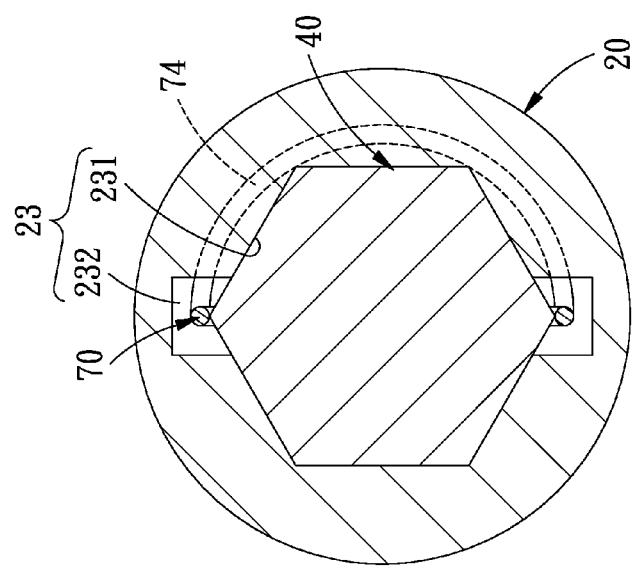
FIG. 9 is a cross-sectional view showing that the small outer diameter quick release extension rod is provided with an engaging portion between the two elastic elements which are circular in cross section.

Further referring to FIGS. 7 and 8, the pushed portions 72 of the two elastic elements 70 are connected by an engaging portion 74 which is a half round structure extending laterally from the body portions 71 of the two elastic elements 70. The engaging portion 74 of the two elastic elements 70 can be engaged on the connecting rod 40 and abutted against by the second positioning ring 80, thus further enhancing the positioning stability of the two elastic elements 70 with respect to the connecting rod 40 as well as the stability of the whole structure of the present invention. In addition, as shown in FIG. 9, the respective elastic elements 70 can also be circular in cross section.

While we have shown and described various embodiments in accordance with the present invention, it is clear to those skilled in the art that further embodiments may be made without departing from the scope of the present invention.

What is claimed is:

1. A small outer diameter quick release extension rod comprising:
    a sleeve including a through hole, the through hole including a screwdriver head accommodation portion and at least one lateral accommodation portion which is disposed at a circumference of the screwdriver head accommodation portion in a communication manner, the screwdriver head accommodation portion being provided for insertion of a screwdriver head;
    an operating unit, including:
    an operating element being a hollow structure and including a first end and a second end that are both open;
    a connecting rod including a connecting end and an inserting end, the connecting rod being inserted into the operating element, the connecting end extending out of the second end of the operating element for connection to a power tool;
    a first positioning ring being mounted on the connecting rod;
    a retuning spring being engaged the first positioning ring and the inserting end of the connecting rod, one end of the returning spring abutting against the first positioning ring;
    at least one elastic element being elongated sheet-shaped and including a body portion connected between a pushed portion and an engaging portion, an extending direction of the pushed portion being reverse to that of the body portion, and between an extending direction of the engaging portion and the extending direction of the body portion being defined an angle of 45±15 degrees, the at least one elastic element being disposed at an inner side of the operating element, the body portion of the elastic element being abutted against the connecting rod, the pushed portion of the elastic element being abutted against the returning spring, and the engaging portion of the elastic element extending out of the first end of the operating element; and
    a second positioning ring being connected to an inner surface of the operating element, the second positioning ring encircling the body portion of the respective elastic element and being abutted against the pushed portion of the elastic element, the operating unit being engaged on the second end of the sleeve through the first end of the operating element, and the engaging portion of the elastic element which extends out of the operating element being inserted into the lateral accommodation portion of the sleeve.

2. The small outer diameter quick release extension rod as claimed in claim 1, wherein the sleeve is hollow and includes a first end and a second end, the second end of the sleeve is smaller than the first end of the sleeve in outer diameter, the first end of the operating element is shaped correspondingly to the outer diameter of the second end of the sleeve, the screwdriver head accommodation portion is a hexagonal hole penetrating the first end and the second end of the sleeve, the lateral accommodation portion is formed from the second end of the sleeve to a position adjacent to the first end of the sleeve.

3. The small outer diameter quick release extension rod as claimed in claim 2 further comprising a magnetic unit disposed between the first end and the second end of the sleeve, the magnetic unit includes a magnetic base, a magnetic element and an elastic element, the magnetic element is disposed on one end of the magnetic base, and the other end of the magnetic base is abutted against one end of the elastic element, the other end of the elastic element is further abutted against the connecting rod, and the magnetic element of the magnetic unit faces toward the first end of the sleeve.

4. The small outer diameter quick release extension rod as claimed in claim 1, wherein the through hole is provided with two lateral accommodation portions, and the two lateral accommodation portions are oppositely disposed at the circumference of the screwdriver head accommodation portion.

5. The small outer diameter quick release extension rod as claimed in claim 1, wherein the second end of the operating element includes an opening which is a hexagonal hole, the connecting end and the inserting end of the connecting rod are both in the form of a hexagonal cylinder, the connecting end of the connecting rod extends out of the opening of the operating element, the inserting end of the connecting rod extends out of the first end of the operating element.

6. The small outer diameter quick release extension rod as claimed in claim 1, wherein the connecting rod is formed with plural spaced engaging concaves around a peripheral surface thereof, and a C-shaped buckle is fastened in the engaging concaves of the connecting rod, the connecting rod together with the C-shaped buckle is inserted into the operating element, the first positioning ring is engaged between the C-shaped buckle and the inserting end, and the first positioning ring abuts against the C-shaped buckle.

7. The small outer diameter quick release extension rod as claimed in claim 1, wherein the extending direction of the pushed portion of the elastic element is vertical to the extending direction of the body portion of the elastic element.

8. The small outer diameter quick release extension rod as claimed in claim 1, wherein an angle between the engaging portion and the body portion of the elastic element is 45 degrees.

9. The small outer diameter quick release extension rod as claimed in claim 1, wherein the second positioning ring is riveted in the operating element.

10. The small outer diameter quick release extension rod as claimed in claim 1, wherein there are two said elastic elements, pushed portions of the two said elastic elements are connected by an engaging portion which is a half round structure extending laterally from the body portions of the two elastic elements, the engaging portion is engaged on the connecting rod and abutted against by the two positioning rings.

\* \* \* \* \*